US011942065B2

(12) United States Patent
Rein et al.

(10) Patent No.: US 11,942,065 B2
(45) Date of Patent: Mar. 26, 2024

(54) METHOD AND SYSTEM FOR AUTOMATIC CREATION OF ALTERNATIVE ENERGY LEVEL VERSIONS OF A MUSIC WORK

(71) Applicant: BELLEVUE INVESTMENTS GmbH Co. KGaA, Berlin (DE)

(72) Inventors: Dieter Rein, Berlin (DE); Jurgen Jaron, Berlin (DE)

(73) Assignee: BELLEVUE INVESTMENTS GmbH & Co. KGaA (DE)

( * ) Notice: Subject to any disclaimer, the term of this patent is extended or adjusted under 35 U.S.C. 154(b) by 200 days.

(21) Appl. No.: 17/826,304

(22) Filed: May 27, 2022

(65) Prior Publication Data

US 2022/0383841 A1 Dec. 1, 2022

Related U.S. Application Data

(60) Provisional application No. 63/193,835, filed on May 27, 2021.

(51) Int. Cl.
*G10H 1/00* (2006.01)

(52) U.S. Cl.
CPC ................................ *G10H 1/0025* (2013.01)

(58) Field of Classification Search
None
See application file for complete search history.

(56) References Cited

U.S. PATENT DOCUMENTS

| | | | | |
|---|---|---|---|---|
| 2010/0218097 | A1* | 8/2010 | Herberger | G11B 27/10 700/94 |
| 2020/0380940 | A1* | 12/2020 | Abdallah | G10H 1/0066 |
| 2021/0125592 | A1* | 4/2021 | Rein | G10H 1/46 |

* cited by examiner

*Primary Examiner* — Hemant S Patel
(74) *Attorney, Agent, or Firm* — Fellers, Snider, Blankenship, Bailey & Tippens, P.C.; Terry L. Watt

(57) ABSTRACT

According to an embodiment, there is provided a system and method for the generation of alternative versions of audio material in DAW projects, wherein the alternative versions feature differing energy and dynamics levels in terms of their musical content.

5 Claims, 5 Drawing Sheets

METHOD AND SYSTEM FOR AUTOMATIC CREATION OF ALTERNATIVE ENERGY LEVEL VERSIONS OF A MUSIC WORK

CROSS REFERENCE TO RELATED APPLICATIONS

This application claims the benefit of U.S. Provisional Patent Application Ser. No. 63/193,835, filed on May 27, 2021, and incorporates said provisional application by reference into this document as if fully set out at this point.

TECHNICAL FIELD

This disclosure relates generally to methods of editing and generating audio content and, in more particular, to methods of utilizing a system and method for the automatic generation of different energy levels for DAW (digital audio workstation) projects.

BACKGROUND

In the last few years, the media industry has been subjected to massive changes in terms of media distribution and content provision to the audience and potential customers. The opportunities for streaming video content via Internet protocols to customers has led to a massive quantity of media that is provided for viewing, based in part on the desire of the media industry to attract customers by providing a vast portfolio of media content. With that immense amount of content comes a need for the media industry to visit and more likely re-visit the audio material associated with and connected to this content. The need is driven partly by the sheer volume of audio material and the need to quickly generate new or replacement audio material that it is fitted in some way to the media content. Additionally, intellectual property rights and the fees associated with it have forced the media industry to re-visit the audio material and the need for software that provides a quick, efficient, and satisfying solution is rising and existent.

DAWs (Digital Audio Workstations) are professional software products that are utilized throughout the industry to produce and generate audio material for use in video as well as stand-alone audio projects. Thus, what is needed is a method of supporting a user of a DAW who is tasked with generating audio content and especially if the task involves quickly producing unique audio works from an existing work. This method is especially needed if the task involves quickly creating audio for use with video works, where the audio must in some sense be matched to the content of the video.

Heretofore, as is well known in the media editing industry, there has been a need for an invention to address and solve the above-described problems. Accordingly, it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with accompanying drawings, should not be construed as limiting the invention to the examples (or embodiment) shown and described. This is so because those skilled in the art to which the invention pertains will be able to devise other forms of this invention within the ambit of the appended claims.

SUMMARY OF THE INVENTION

According to an embodiment there is provided a system and method for the generation of different versions of a pre-existing music work. Various embodiments create different audio versions from an initial or starter music piece, where the resulting audio works preferably exhibit different energy levels. In one embodiment, the algorithm utilizes a DAW and the structural layout of the music piece to generate versions of a selected music piece with different energy vibes—e.g., low energy, medium energy and potentially high energy, with the algorithm that is applied preferably resulting in four different versions (including the starter music piece) allowing a user instantly and/or smoothly switch between these different versions when setting new, alternative music utilizing these different versions to video material.

In one variation, the instant invention provides a support system for a DAW when generating or working with a music piece wherein the system is tasked with automatically generating multiple versions of a selected music piece. These multiple versions represent versions of the selected music piece with different energy levels—energy levels representing the drive, vibe, and power of a music piece content wise.

It should be clear that an approach such as this would be a tremendous aid to the user and would additionally mean a tremendous development in the creation of music pieces, wherein the formerly tedious and mostly straining process of manually generating different versions of an initial music piece is being replaced by the instant invention. Therefore, this approach delivers functionality to the user of music creation programs that enables a user to initiate, continue and complete a music generation process that is directed to a very specific outcome in a satisfactory manner or even allows a user to automate such a music generation process completely.

The foregoing has outlined in broad terms some of the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood, the phraseology and terminology employed herein are for the purpose of description and should not be regarded as limiting, unless the specification specifically so limits the invention. Further objects, features and advantages of the present invention will be apparent upon examining the accompanying drawings and upon reading the following description of the preferred embodiments.

BRIEF DESCRIPTION OF THE DRAWINGS

These and further aspects of the invention are described in detail in the following examples and accompanying drawings.

DETAILED DESCRIPTION

Figure 1:
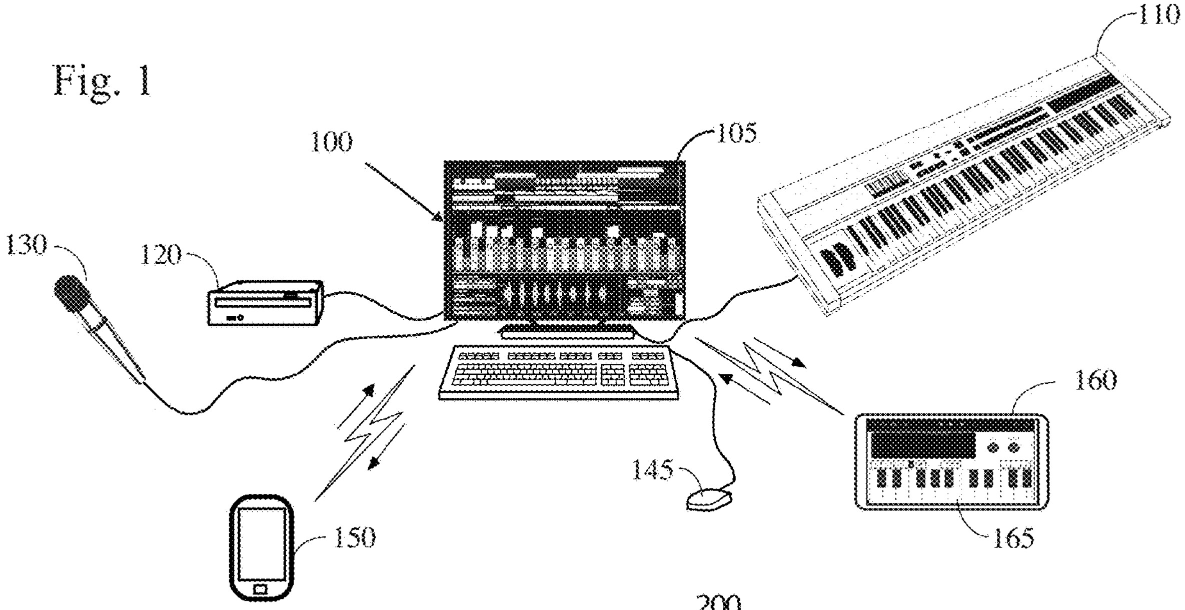
FIG. 1 depicts a general working environment of an embodiment of the instant invention.

While this invention is susceptible of embodiments in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

As is generally indicated in FIG. 1, at least a portion of the instant invention will be implemented in form of DAW software 105 running on a user's computer 100, where "computer" might include a programmable device such as a smart phone 120, tablet computer, etc., running its own DAW software 130, providing input to a computer running a DAW program, etc. Such a desktop, laptop, etc., computer will have some amount of program memory and storage (including magnetic disk, optical disk, SSD, etc.), which might be either internal, external, or accessible via a network as is conventionally utilized by such units. As is generally indicated, the smart phone 160 might communicate wirelessly with the computer 100 via, for example, Wi-Fi or Bluetooth. Some embodiments might benefit from the use of a music keyboard 110 or keyboard workstation which might be connected either wirelessly or wired (e.g., via USB, a Midi cable, etc.) with the computer or table, phone, etc. Note that although DAW-type software will often be used, that is not a requirement of the instant invention.

Additionally, a microphone 130 might be utilized so that the user can add voice-over narration to a multimedia work or so that the user can control his or her computer via voice-recognition software. A CD or DVD burner 120 or other external storage device (e.g., a hard disk, external SSD, etc.) could be useful for storing content on writable or rewritable media. Additionally, it might be possible that a mobile music data storage device 150 could be connected to the computer, such as an mp3 player for example, for storage of individual music clips or other data as needed by the instant invention.

Figure 2:
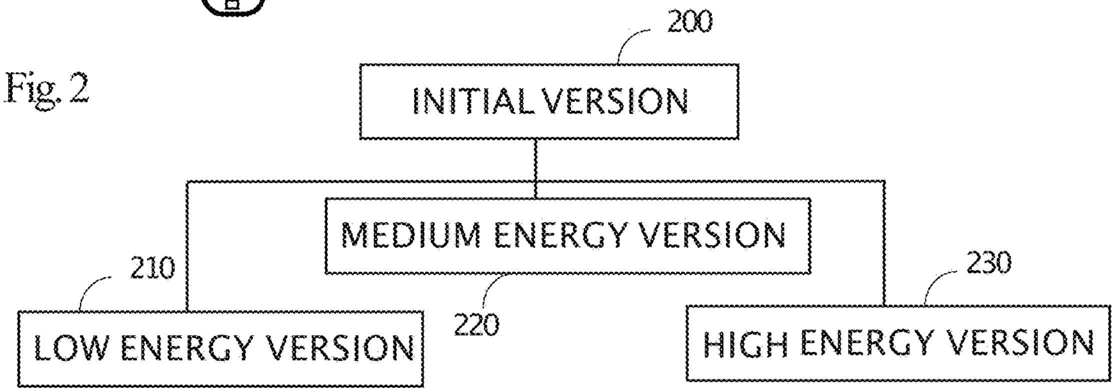
FIG. 2 illustrates the different versions of a music piece generated by the instant invention.

Turning next to FIG. 2, this figure illustrates one approach of generating the different versions of the music work by the instant invention. An initial or starter version 200 of the music item is necessary. The initial version is selected by the user and will be used as the starting point of the instant embodiment. After the initial version has been selected, the user will either select the desired version(s) that he or she would like to have generated from the initial version or, alternatively, the instant invention will initiate the generation process automatically and provide a low energy 210, a medium energy 220 and/or a high energy version 230 of the initial music item as an end product result to the user.

Figure 3:
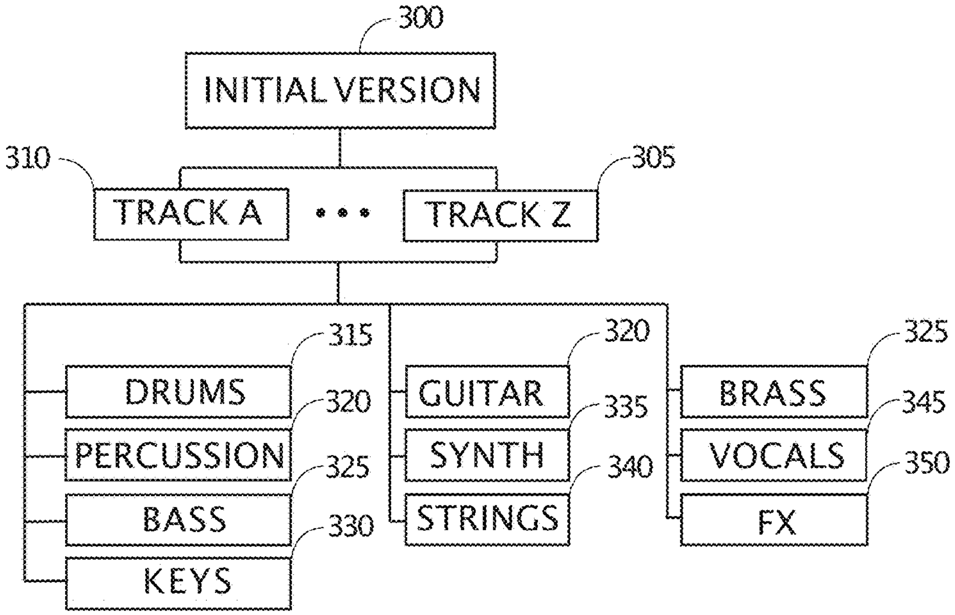
FIG. 3 depicts the setup of the music piece as utilized by the algorithm of the instant invention.

FIG. 3 illustrates one possible structure of a typical music work of the sort that might be selected as the initial version 300 for use as a starting point in generating different energy level versions. With respect to the initial version 300, the selected music work is provided to the system as a multi-track project. Those of ordinary skill in the art will recognize that multitrack recording, also known as multitracking, is a method of sound recording developed in 1955 that allows for the separate recording of multiple sound sources, which may have been recorded contemporaneously or separately, which are then combined to create a cohesive work.

Multitracking in the early days was device-based on recording different audio channels to separate tracks on the same reel-to-reel tape. Of course, today software for multi-track recording is disk-based and can record and save multiple tracks simultaneously. Instrument tracks and voice tracks are usually recorded and stored as individual files on a computer hard drive. This makes it convenient to add, remove, or process the stored tracks in many different ways. In FIG. 3 the multitrack structure is represented by the labels "A" (for "TRACK A" 310) and "Z" (for "TRACK Z" 305), with the letters being chosen to generally indicate that the initial music work could comprise any number of tracks, e.g., A to Z in this example. Of course, the foregoing should not be interpreted to indicate that the initial music work 300 could only have 26 tracks or must have 26 tracks. It is certainly possible, as is well known to those of ordinary skill in the art, that the initial music work 300 might contain more or fewer tracks than 26.

In this particular example, the following tracks are part of the initial version of the music piece, 300. Note, from now on the tracks will, for better understanding, often be referred to as instrument classes based on the content of their audio files or their track label. That is, the initial version 300 in this example comprises the following instrument classes: Drums 315, Percussion 320, Bass 325, Keys 330, Guitar 320, Synth 335, Strings 340, Brass 325, Vocals 345, and FX 350. Each of these instrument classes will be utilized and possibly affected during the implementation of the instant invention as is described below. Note that for purposes of the instant disclosure and the claims that follow, it will be assumed that the initial music item always has at least one track associated with a drum instrument class, at least two tracks that are either associated with an FX or a vocals instrument class, and at least two tracks that are associated with a tonal instrument class.

Figure 4:
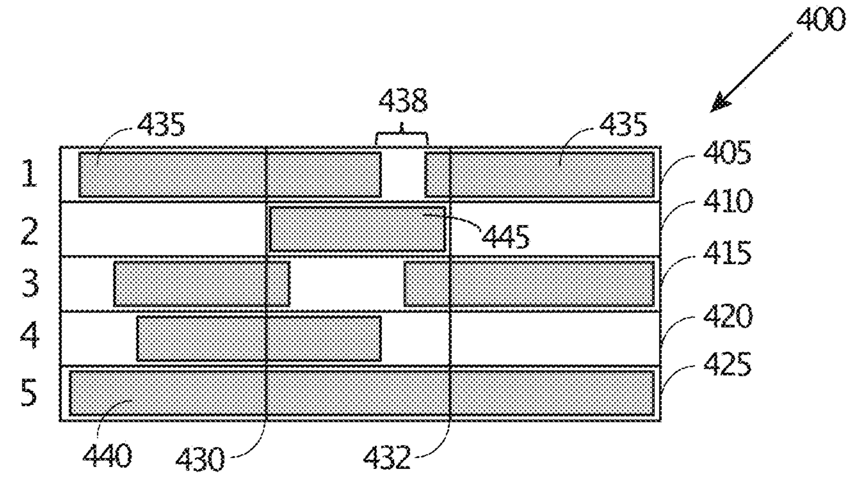
FIG. 4 discloses the preferred layout of the music piece as arranged in the DAW utilized by the instant invention.

Turning next to FIG. 4, this figure contains a generalized representation of the layout and structure of an initial music piece as it might appear within a DAW or other audio editing program. This figure also represents a high-level view of the selection options in one possible graphical user interface 400. In this embodiment, the multi-track arrangement of the utilized DAW 400 is illustrated with individual tracks or instrument classes arranged next to each other. In this figure, each of these illustrated five tracks (labelled 1 to 5) represents one instrument class. As is the case with most DAWs there is an option to have the DAW perform a synchronized replay that allows the user to simultaneously listen to all tracks of the initial music piece in its entirety or to select a single or multiple tracks and listen to any combination of tracks selected. In FIG. 4, five tracks are represented but certainly there could be many more or fewer.

In this particular example, and for purposes of illustration only, the tracks have been arbitrarily designated containing audio content comprising guitar 405, percussion 410, bass 415, keys 420 and drums 425. In certain embodiments it is preferred that the initial music item have at least 10 different tracks and the fact that this figure has only 5 tracks should not be interpreted to limit an initial music choice to having only that number of tracks. Additionally in this figure the audio material stored in each track is displayed in a manner that makes it possible for the user to tell when the contents of a track are presently being played and when they are silent. For example, in track number 1 which contains the guitar 405 audio, there is a time period 438 during which the guitar 435 is silent. In some cases, a track might be completely filled with audio content as is the case with the audio content 440 of the drum track 425, or it might contain audio material of shorter duration 445, all depending on the musical design of the initial music piece. The graphical user interface of this example also contains dividers that indicate the limits of the musical bars or measures 430 and 432 as is conventionally done.

Figure 5:
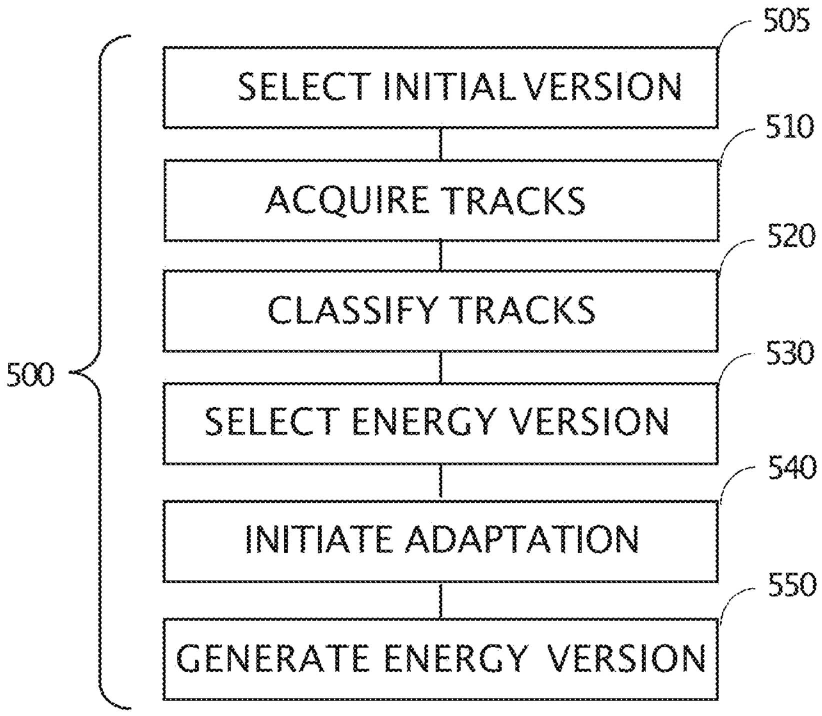
FIG. 5 illustrates an example of a general workflow of the instant invention.

Turning next to FIG. 5, this figure illustrates one general high-level workflow of the instant invention. As a first preferred step of this embodiment 500 the user selects the initial music work 505. In a next preferred step, the instant invention will acquire 510 (e.g., read from disk or memory) the tracks that are the foundation of the selected initial music piece, if this music piece has been stored in a multitrack format. Next, the user will be asked to classify the instrument class of each track 520 (e.g., drums, FX, guitar, etc.) if that information has not been provided within the metadata of the selected initial music piece. After step 520, each track will have been classified into an individual instrument class. In some embodiments the class choices might be drums, percussion, bass, keys (keyboard), guitar, synth, strings, brass, vocals, and FX (i.e., sound effects). As noted previously, these instrument classes are usually already identified as part of the initial music piece metadata but, if not, the user will be asked to provide that information for each track.

As a next preferred step, the user will select the desired output energy level(s) 530 of the generated music items which will be provided by the instant invention. The user will preferably be able to select energy levels from categories such as low, medium, and high energy. However, in some cases the selection might be made automatically instead of requiring user interaction. In that case, the instant embodiment would skip the manual selection step and, after classification of the tracks 520, automatically generate variants of the initially selected music piece at one or more different energy levels.

Either way, in a next preferred step the instant invention will initiate the adaptation 540 of the selected initial music piece and implement the necessary steps to produce each energy level version which results in the generation of the desired energy version(s) 550. Note that the adaptation step 540 will involve, as described in greater detail hereinafter, assigning new volume or loudness levels to each the tracks of the initial music work and selectively muting certain tracks (either within certain windows or completely) if they meet the stated criteria. The last step 550 produces the desired new version with the selected energy level by applying the new volume or loudness levels to each track of the initial music item and muting (either within certain windows or completely) the tracks according to the methods discussed hereafter. In this way the initial music item is used to produce a new music item with the same general characteristics but a different energy level.

As will be described in greater detail below, in some embodiments the instant invention will operate on a starting music piece that might already be complete. In other cases, it might be an incomplete item that the user is currently working on. In either case, the instant invention automatically generates, besides a standard version that is being utilized as the base line version, a low, medium, and a high energy version of the selected starting music piece. According to one embodiment, for the generation of medium and low energy level versions and the standard version of the music piece, an embodiment analyses each of the individual instrument classes and applies values to the volumes of the individual tracks and to the global volume parameter of the entire music piece. Additionally, certain embodiments provide for a micromanagement of the process by allowing the user to select specific values for the volume parameter of individual instrument classes.

Figure 6:
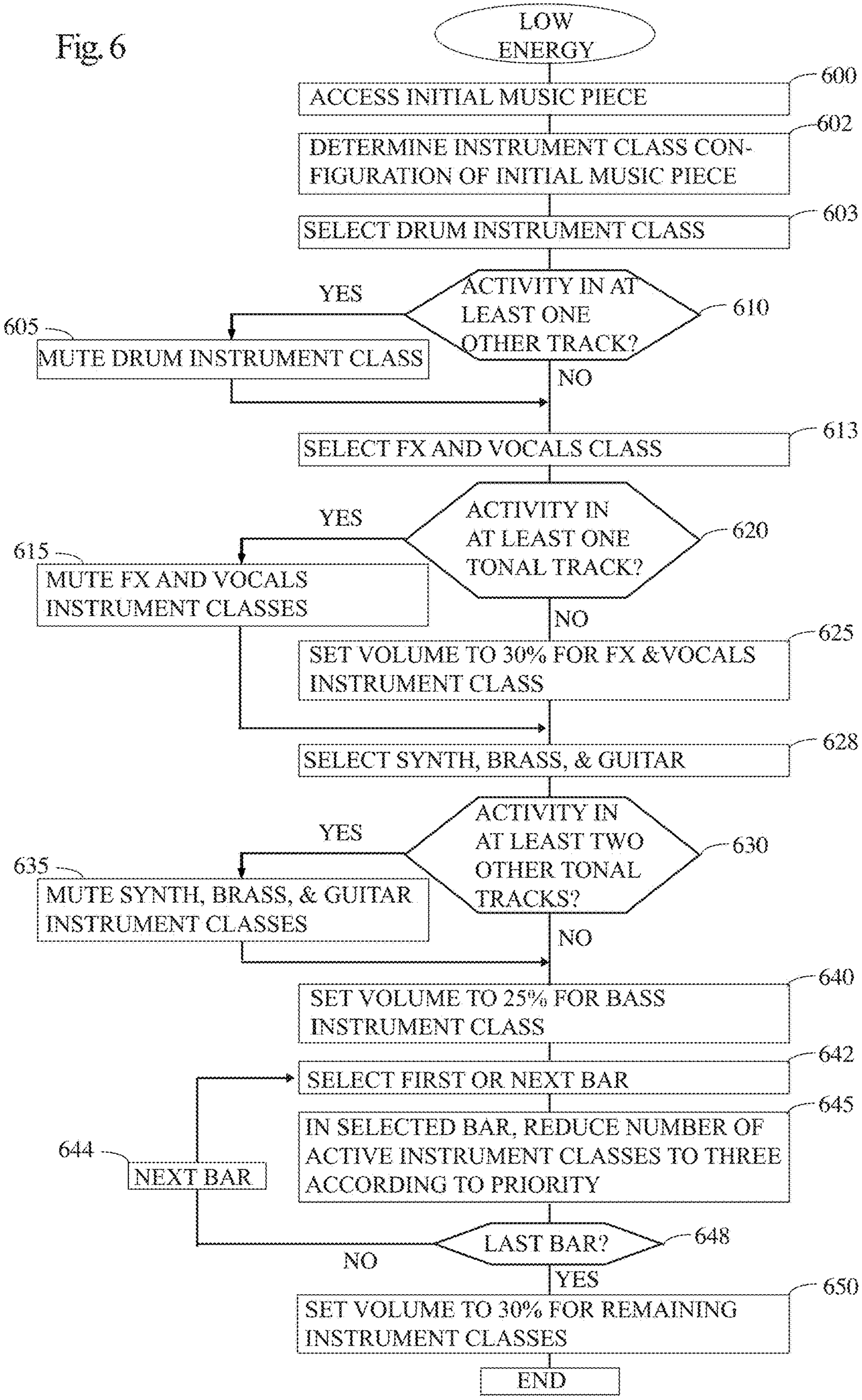
FIG. 6 discloses a preferred workflow when generating a low energy version from an initial music piece.

FIG. 6 contains an example of a general operating logic for use when a low energy version of a music piece is to be generated. As a first step 600, the initial music piece will be accessed which might mean a computer file (or files) is read from storage, e.g., ready from a hard disk, SSD, or memory. Next, the instrument class associated with each track will be determined 602 which might involve reading the multitrack organization and track identifications from a file and providing the user with a graphical display of the multitrack structure. In some instances, though, the user may be asked to provide the instrument class for each track or be given the option to edit the information stored in the metadata to modify the pre-stored another instrument class. In either case, it is expected that the on-screen representation of the music item will be modified to display the instrument class of each track.

As a next preferred step, the instant invention will select the drum instrument class 603 and mute the drums instrument class 605 completely if at least one other instrument class is active at each point in time, i.e., unless at some point all of the tracks except for the drum track are silent (decision item 610). If there is no drum track, this embodiment will skip to box 613.

Note that the term active in this context means that from a selected time point the instant invention determines if audio content is present in a timeframe extending from, say, 1 to 4 bars thereafter and is capable of being played back in the track of the associated defined instrument classes. Of course, the length of the timeframe/window is something that could be varied depending on the situation and, in some cases, the timeframe could cover the entire initial music work. For example, in FIG. 4 assume that the timeframe is 1 bar beginning at bar 430. In that case, all of the tracks would be considered active, even though the audio in some tracks has occasional gaps. As another example, if the starting point is bar 432, in that case only tracks 1, 3, and 5 would be active. Finally, assume for purposes of illustration that track 5 contains the audio for the drum instrument class and the initial music work consists of only the three bars illustrated in FIG. 4. In that case, assuming again that the timeframe is 1 bar, the decision item 610 would need to examine each of the three bars separately to determine if there was activity in at least one track. However, if the timeframe were 3 bars, all of tracks 1 to 4 would be considered active since all of them have some audio content in the three bars following the start of the music item. Inactive obviously means the opposite, i.e., that no audio content is being played in a track within the time frame in question.

Continuing with this embodiment, the vocals and FX instrument class will be selected 613 and be muted 615 if at least one tonal instrument class is active (decision item 620). As before, depending on the chosen timeframe length, decision item 620 may need to step through the initial music work and decide at multiple time points if there is activity in a track and whether or not the FX and/or vocals need to be muted.

If there are no FX or vocal instrument class tracks, the instant approach will skip to step 628. The tonal instrument classes are keys, string, synth, brass, bass, and guitar. Note that this list does not necessarily represent an order of preference nor is it a comprehensive list. However, for purposes of the instant application when the term "tonal instrument class" is used this phrase is associated with one of these six instrument classes. This list is just given as an example and represents a selection of names for the instrument classes to clarify the description of an embodiment of the invention. In the event that none of tonal instrument classes is active—the volume value of the vocals and FX instrument class will be set to 30% 625 of its current value. This volume adaptation percentage is meant to be applied to the absolute volume level that is globally set for the music piece.

In a next preferred step, when tasked with the generation of a low energy version the melody lines of the music piece are modified. That is, the melody instrument classes (e.g., synth, brass, and guitar) will be selected 628 and successive timeframes processed in such a way that these melody instrument classes are muted 635 completely if at least two more instrument classes (which do not necessarily need to be melody instrument classes) remain active in a timeframe (decision item 630). Note that if there is not activity in at least two other tonal tracks, the synth, brass, and guitar instrument classes will be treated as a "remaining instrument class" in connection with box 650 below. Again, this decision item may need to be evaluated for multiple windows/timeframes within the initial music work.

For the bass instrument class, the initial volume value will in some embodiments be reduced to 25% 640 of its original value for the generation of the low energy version. That being said, volume reductions between about 20% and 30% might be useful in some scenarios.

Continuing with the present embodiment, after these five processing steps the number of active instrument classes within each bar, each music piece comprising a specific bar setting—for example 4 bars—will be analysed and for the generation of the low energy version the number of active instrument classes will be reduced to a maximum of three (steps 642, 645, 648, and 644) utilizing a priority list 645 until the desired number is reached. In the current embodiment, the priority list is as follows: vocals, FX, synth, brass, strings, drums, percussion, with percussion being the lowest in priority to keep, i.e., the first to be muted, and vocals being the highest in priority to keep and last to be muted.

In a last step, after all of the bars have been processed (decision item 648) for the generation of a low energy version, the instant embodiment determines the volume level of each remaining instrument class and adjusts the volume level of these instrument classes to 30% 650, or more generally between about 25% and 35% of the original volume. By "remaining instrument classes" is meant any tracks in the initial music work which have not been muted or had their initial volumes adjusted. Note that there may or may not be any such tracks remaining depending on the number of tracks in the initial music work and how the instrument classes have been treated.

In the some embodiments all of the above-mentioned steps are implemented sequentially on the initially selected music piece with the user given a chance to review the change in the initial version at, for example, points 613, 628, 640, and 650. That is, the user will be able to play the initial version as modified by the muting (if any) and/or volume adjustments to that point. Alternatively, the entire method of FIG. 6 might be implemented in its entirety and the user given the option to review the final product after step 650.

Figure 7:
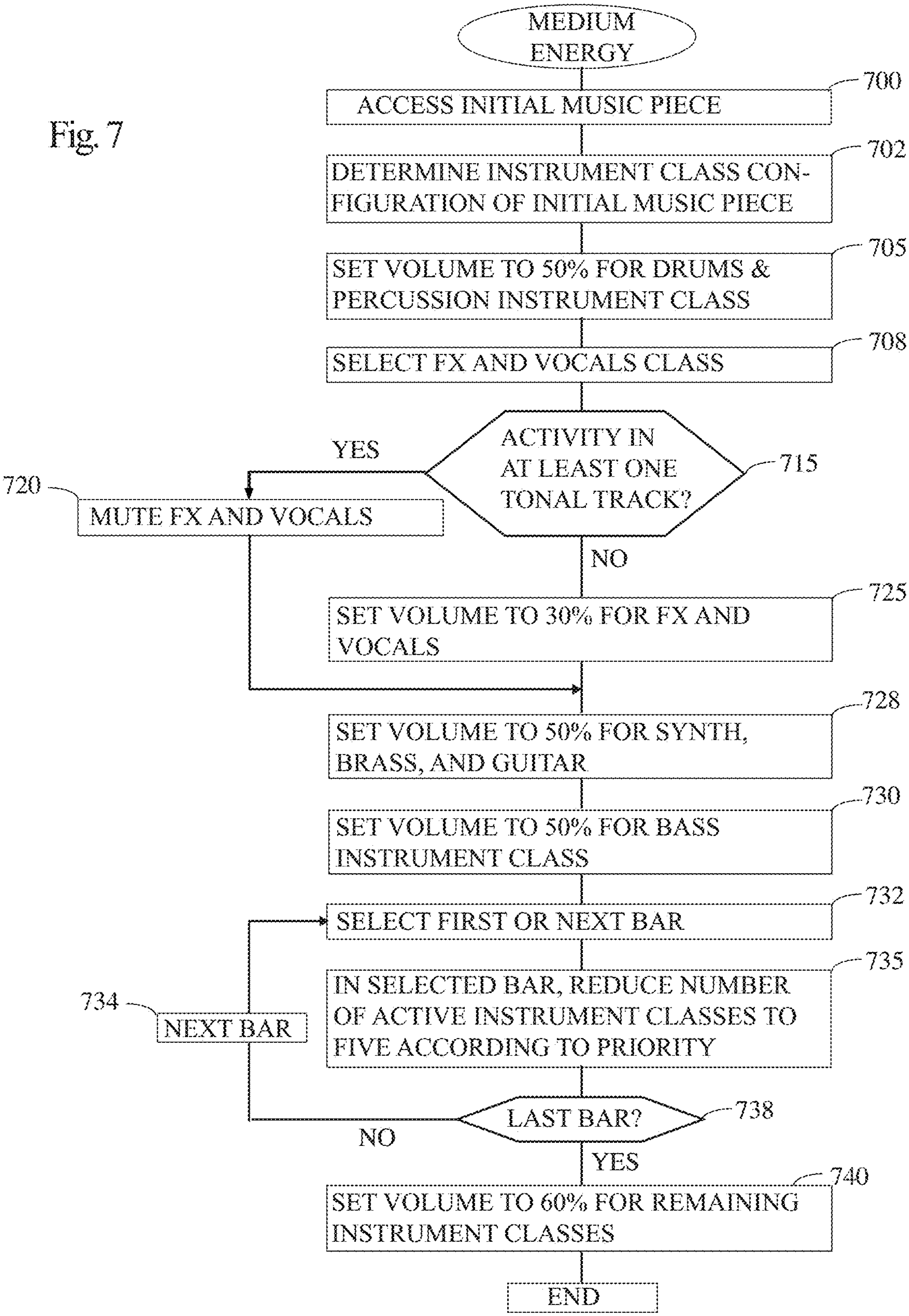
FIG. 7 discloses one possible workflow when generating a medium energy version from an initial music piece.

FIG. 7 illustrates a method similar to that set out in FIG. 6, except that FIG. 7 provides an example of how a medium energy version might be generated from an initially selected music piece. As can be seen, a first preferred step in this approach is to access the initial music piece 700 and determine the instrument class configuration of the initial music piece 702, which comprises reading the multitrack setup of the initial music piece and providing the user with a graphical display of the determined multitrack structure. Additionally, the instant invention will gather the instrument class descriptions of each individual track from the metadata of the initial music piece and will adapt the graphical display accordingly. Alternatively, and as has been described previously, if the information sought in the metadata is not present the user might be asked to manually provide that information.

As a next preferred step, this process is initiated by reducing the volume level of the drums and percussion instrument class 708 to 50% 705 of its previous value. Of course, in some embodiments the volume reduction might differ from 50%, e.g., reductions of between 45% and 55% might be helpful in some instances. Additionally, the vocals and FX instrument class are also muted 720 if at least one tonal instrument class is active in a timeframe (decision item 715 and step 720). As was noted previously, tonal instrument classes include keys, string, synth, brass, bass, and guitar. In the event that none of these instrument classes is active—the volume values of both the vocals and FX instrument classes are set to between 25% and 35% or, preferably, about 30% 725 of their original volumes.

As a next step the algorithm reduces the melody tracks for the medium energy version, where the volume of the melody instrument classes (synth, brass, and guitar) is reduced to 50% 728. For the bass instrument class, the volume value is reduced to 50% 730 in a next preferred step. Of course, those of ordinary skill in the art might find it useful to reduce the volume of either melody instrument class or bass class or both by an amount different from 50%, e.g., the volume reduction might be chosen to be between 45% and 55% for one or the other.

Continuing with the current embodiment, after the previous processing steps the number of active instrument classes within each bar is determined. In some embodiments the initial music piece might comprise, for example, 4 bars although longer and shorter music items are certainly possible and have been specifically contemplated by the instant inventors. For the medium energy version, the number of active instrument classes is reduced to a maximum of five 735 in each bar by utilizing a priority list until the desired number is reached. This is done one a bar-by-bar basis, i.e., each bar is separately analysed, and the number of active instrument classes is reduced to five. The preferred priority list is as follows: vocals, FX, synth, brass, strings, drums, percussion. That is, the vocal track is the most preferred to keep and percussion the least preferred to keep and first to be muted.

In a last step for the generation of the medium energy version the instant embodiment determines the volume level value for each remaining instrument class and changes the volume level of each such instrument class to 60% 740 of its initial or original value or, in some embodiments, to a value between about 55% and 65%. As noted previously, "remaining instrument classes" should be interpreted to mean the tracks in the initial music work, if any, which have not been muted or had their initial volumes adjusted pursuant to the current method.

Figure 8:
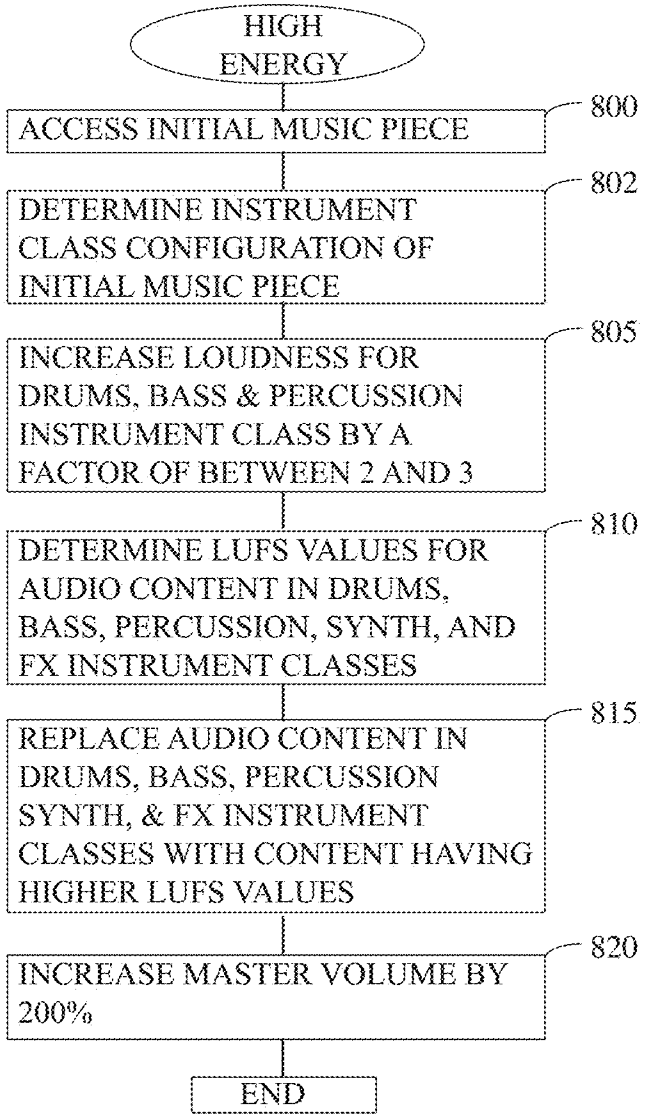
FIG. 8 discloses an embodiment of a workflow when generating a high energy version from an initial music piece.

For the generation of the high energy version of the selected initial music piece the instant invention will initiate the steps generally represented in the embodiment of FIG. 8. As can be seen, the steps associated with creating a high energy version differ somewhat from those utilized when generating low or medium energy versions. As first step this embodiment accesses the music piece 800 and determines the instrument class setup of the initial music piece 802. As before, the multitrack setup of the initial music piece will be read or otherwise accessed, and the user will be provided with an on-screen representation of the determined multi-track structure. Additionally, the instant invention will gather the instrument class descriptions of each individual track from the metadata of the initial music piece (or from the user) and will adapt the graphical display accordingly.

In a next preferred step, the instrument classes of drums, bass and FX are selected first and for these instrument classes the loudness is increased by a ratio of between about 2 and 3 with the application of dynamic range compression 805. The user is able to select the ratio value, listen to an excerpt or the full music piece after the loudness has been adjusted and accept or reject the changes. It should be noted that the loudness in the realm of audio editing represents audio intensity perceived by the listener, i.e., loudness defines how loud a listener perceives a song or music piece to be.

For audio editing there are a number of possible ways to measure loudness, however in the industry one value has more or less been adopted as the industry standard—LUFS (Loudness Units Full Scale). Under this measure, selecting a change in loudness ratio, changes the loudness level accordingly. For example, those of ordinary skill in the art will recognize that adjusting a track by a loudness ratio of 3 represents three times the loudness and changes the sound loudness level by +15 db. Similarly, a loudness ratio of 2 represents two times the loudness and changes the loudness level by +10 db.

Continuing with the present example, the method determines if the instrument classes drums, bass, percussion, synth, and FX are active, i.e., if there is audio content (e.g., audio samples or audio loops) available in these instrument classes. If that is the case, the method sequentially determines the LUFS value of each of these samples or loops 810 and replaces these samples or loops with similar sounding audio loops or samples that feature higher LUFS values 815. For this particular algorithm, a database of samples or audio loops stored appropriately for each instrument class is provided, with each of the stored audio samples/audio loops having LUFS values associated therewith, preferably stored as metadata. However, it is also possible that multiple other audio resources could be integrated into the replacement process. That is, the instant invention is not limited to the use of a previously assembled database and the content from the multiple audio resources could be analysed regarding its LUFS values dynamically and on the fly.

As a last preferred step, the overall volume of the music piece, will be increased by 200% 820. In some embodiments a sum limiter might be employed to prevent distortion, where a "sum limiter" is simply a function that limits the maximum total audio output of all tracks combined. Note that the 200% value is just an example of a preferred volume increase and in some embodiments, it might be between 150% and 250%.

With these steps the perceived energy of an initial music piece will be immensely enhanced without harming the general character of that particular music piece.

After the instant invention has generated any or all of the three energy level variants (low, medium, high) the user, utilizing the DAW or any other audio or video editing software, will be able to switch between, cross fade, blend together, etc., all four versions when utilizing the music piece to score video material. This will make it possible for the user to be able to adapt the energy and the dynamics of the audio material to the content of the video source with more precision than has been possible previously.

It is to be understood that the terms "including", "comprising", "consisting", and grammatical variants thereof do not preclude the addition of one or more components, features, steps, or integers or groups thereof and that the terms are to be construed as specifying components, features, steps, or integers.

If the specification or claims refer to "an additional" element, that does not preclude there being more than one of the additional elements.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiment, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a range having an upper limit or no upper limit, depending on the variable defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)—(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7—91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., “about”, “substantially”, “approximately”, etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

CONCLUSIONS

Of course, many modifications and extensions could be made to the instant invention by those of ordinary skill in the art.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of generating a low energy music work from an initial music work, said initial music work comprising at least five tracks, wherein:

said initial music work comprises a plurality of bars, and said initial music work comprises at least five tracks, at least one of said at least five tracks is associated with a drum instrument class, at least two of said at least five tracks are associated with either an FX instrument class or a vocals instrument class, and at least two of said at least five tracks are associated with a tonal instrument class, said tonal instrument class comprising a keyboard instrument class, a string instrument class, a synth instrument class, a brass instrument class, a bass instrument class, and a guitar instrument class, comprising the steps of:

(a) accessing said initial music work;

(b) if at least one track of said initial music work that is not associated with said drum instrument class is active, muting each of said at least one track associated with said drum instrument class;

(c) if at least one of said at least two tracks associated with said tonal instrument class is active, muting all of said tracks associated with said FX instrument class and said vocals instrument class;

(d) if none of said at least two tracks associated with said tonal instrument class is active:

(d1) determining an initial volume of each track associated with said FX instrument class, (d2) determining an initial volume of each track associated with said vocals instrument class, (d3) reducing said initial volume of each track associated with said FX instrument class to between 25% and 35% of said initial volume of said each track associated with said FX instrument class, and (d4) reducing said initial volume of each track associated with said vocals instrument class to between 25% and 35% of said initial volume of said each track associated with said vocals instrument class;

(e) identifying a first tonal instrument class comprising:

(e1) every track associated with said synth instrument class, (e2) every track associated with said brass instrument class, and (e3) every track associated with said guitar instrument class;

(f) identifying a second tonal instrument class comprising:

(f1) every track associated with said string instrument class, (f2) every track associated with said keyboard instrument class, and (f3) every track associated with said bass instrument class;

(g) if at least two of said tracks associated with said second tonal group is active, mute any tracks associated with said first tonal instrument class;

(h) determining an initial volume of any track associated with said bass instrument class;

reducing said initial volume of any track associated with said bass instrument class to between 20% and 30% of said initial volume of said any tracks associated with said bass instrument class;

for each bar within said initial music work:

(j1) determining any active tracks within said bar, (j2) determining an instrument class associated with each of said active tracks, (j3) determining a number of different instrument classes associated with said active tracks in said bar, (j4) if said number of determined instrument classes in said bar is greater than three, using a predetermined priority list to reduce said number of active instrument classes within said bar to three by muting active tracks according to said predetermined priority list;

(k) setting a volume to between 25% and 35% of an initial volume for each track not already reduced in volume, thereby forming said low energy music work from said initial music work; and (l) performing at least a portion of said low energy music work for a user.

2. The method of generating a low energy music work from an initial music work according to claim 1, wherein said predetermined priority list is an ordered listing comprising said vocals instrument class, said FX instrument class, said synth instrument class, said brass instrument class, said strings instrument class, said drums instrument class, and a percussion instrument class, wherein said percussion instrument class is a first to be muted and said vocals instrument class is a last to be muted.

3. A method of generating a medium energy music work from an initial music work, wherein:

said initial music work comprises a plurality of bars, and said initial music work comprises at least five tracks, at least one of said at least five tracks is associated with a drum instrument class, at least two of said at least five tracks are associated with either an FX instrument class or a vocals instrument class, at least two of said at least five tracks are associated with a tonal instrument class, said tonal instrument class comprising a keyboard instrument class, a string instrument class, a synth instrument class, a brass instrument class, a bass instrument class, and a guitar instrument class, comprising the steps of:

(a) accessing said initial music work;

(b) reducing a volume of every track associated with said drum instrument class by between 45% and 55%;

(c) reducing a volume of every track associated with a percussion instrument class by between 45% and 55%;

(d) if at least one of said at least two tracks associated with said tonal instrument class is active, muting all of said tracks associated with said FX instrument class and with said vocals instrument class;

(e) if none of said at least two tracks associated with said tonal instrument class is active, (e1) determining an initial volume of each track associated with said FX instrument class, (e2) determining an initial volume of each track associated with said vocals instrument class, (e3) reducing said initial volume of each track associated with said FX instrument class to between 25% and 35% of said initial volume of said each track associated with said FX instrument class, and (e4) reducing said initial volume of each track associated with said vocals instrument class to between 25% and 35% of said initial volume of said each track associated with said vocals instrument class;

reducing a volume of every track associated with said synth instrument class by between 45% and 55%;

(g) reducing a volume of every track associated with said brass instrument class by 50%;

(h) reducing a volume of every track associated with said guitar instrument class by between 45% and 55%;

reducing a volume of every track associated with said bass instrument class by between 45% and 55%;

for each bar within said initial music work:

(j1) determining any active tracks within said bar, (j2) determining an instrument class associated with each of said active tracks, (j3) determining a number of different instrument classes associated with said active tracks in said bar, (j4) if said number of determined instrument classes in said bar is greater than five, using a predetermined priority list to reduce said number of active instrument classes to five by muting active tracks according to said predetermined priority list;

(k) reducing a volume to between 55% and 65% of an initial volume for each track not already having a reduction in volume applied thereto, thereby forming said medium energy music work from said initial music work; and (l) performing at least a portion of said medium energy music work for a user.

4. A method of generating a medium energy music work from an initial music work according to claim 3, wherein said predetermined priority list is an ordered listing comprising a vocals instrument class, an FX instrument class, a synth instrument class, a brass instrument class, a strings instrument class, a drums instrument class, and a percussion instrument class, wherein said percussion instrument class is a first to be muted and said vocals instrument class is a last to be muted.

5. A method of generating a high energy music work from an initial music work, said initial music work comprising at least five tracks, wherein:

said initial music work comprises a plurality of bars, said initial music work has a master volume associated therewith, and said initial music work comprises at least five tracks, at least one of said at least five tracks is associated with a drum instrument class, at least two of said at least five tracks are associated with either an FX instrument class or a vocals instrument class, at least two of said at least five tracks are associated with a tonal instrument class, said tonal instrument class comprising a keyboard instrument class, a string instrument class, a synth instrument class, a brass instrument class, a bass instrument class, and a guitar instrument class, and wherein is provided a database of audio loops corresponding to each of said instrument classes in said initial music work, each of said audio loops having a LUFS value associated therewith, comprising the steps of:

(a) accessing said initial music work;

(b) determining an instrument class associated with each of said at least five tracks;

(c) increasing a loudness of each of said tracks associated with said drum instrument class by a factor of between 2 and 3;

(d) if any of said at least five tracks is associated with a bass instrument class, increasing a loudness of each of said tracks associated with said bass instrument class by a factor of between 2 and 3;

(e) if any of said at least five tracks is associated with a percussion instrument class, increasing a loudness of each of said tracks associated with said percussion instrument class by a factor of between 2 and 3;

(f) for each of said at least five tracks not associated with either a percussion instrument class, a drum instrument class, or a bass instrument class, (f1) selecting a track not associated with a percussion instrument class, a drum instrument class, or a bass instrument class, (f2) determining a selected instrument class for said selected track, (f3) determining a selected LUFS value for said selected track, (f4) identifying in said database an audio loop associated with said selected instrument class having a LUFS value greater than said selected LUFS value, (f5) replacing any audio content in said selected track with said identified audio loop;

(g) increasing said master volume of said initial music work by a factor between 150% and 250%, thereby forming said high energy work from said initial music work; and (h) performing at least a part of said initial music work for a user.

* * * * *